US008661767B2

(12) United States Patent
Svendsen (10) Patent No.: US 8,661,767 B2
(45) Date of Patent: Mar. 4, 2014

(54) STARTING PLATFORM WEDGE ANCHOR ASSEMBLY

(75) Inventor: Bill Svendsen, Sherwood, OR (US)

(73) Assignee: S.R. Smith, LLC, Canby, OR (US)

( * ) Notice: Subject to any disclaimer, the term of this patent is extended or adjusted under 35 U.S.C. 154(b) by 0 days.

(21) Appl. No.: 13/269,906

(22) Filed: Oct. 10, 2011

(65) Prior Publication Data

US 2012/0144577 A1    Jun. 14, 2012

Related U.S. Application Data

(63) Continuation of application No. 12/467,069, filed on May 15, 2009, now Pat. No. 8,033,077, which is a continuation of application No. 11/206,375, filed on Aug. 17, 2005, now Pat. No. 7,543,415.

(60) Provisional application No. 60/637,502, filed on Dec. 19, 2004.

(51) Int. Cl.
*F16B 2/04* (2006.01)
*E04H 4/14* (2006.01)
*F16B 7/04* (2006.01)
*E04H 12/22* (2006.01)

(52) U.S. Cl.
CPC .............. *F16B 2/04* (2012.01); *E04H 12/2269* (2013.01); *B04H 4/14* (2013.01)
USPC .................. 52/706; 52/298; 403/374.4; 4/496

(58) Field of Classification Search
USPC ...................... 52/169.13, 170, 298, 704, 706; 248/188, 188.1, 346.01, 501, 503; 411/34, 44, 55, 57.1, 60.2, 385; 403/300, 308, 314, 374.4
See application file for complete search history.

(56) References Cited

U.S. PATENT DOCUMENTS

| | | |
|---|---|---|
| 2,972,495 A | 2/1961 | Yalen |
| 3,400,905 A | 9/1968 | Van Dusen, Jr. |
| 3,596,426 A | 8/1971 | Loov |
| 3,653,169 A | 4/1972 | Jenner |
| 3,805,468 A | 4/1974 | Granstrom |
| 4,059,934 A | 11/1977 | Hayamizu |
| 4,133,154 A | 1/1979 | Ruzicka |
| 4,775,260 A | 10/1988 | Kecmer |
| 4,824,303 A | 4/1989 | Dinger |
| H906 H | 4/1991 | Baggett et al. |
| 5,029,820 A | 7/1991 | Katz |
| 5,779,388 A | 7/1998 | Yamamoto |
| 6,125,608 A | 10/2000 | Charlson |
| 6,357,960 B1 | 3/2002 | Cornelius et al. |
| 7,455,471 B2 | 11/2008 | Gawehn |
| 2004/0156676 A1 | 8/2004 | Boudreaux et al. |
| 2004/0199990 A1* | 10/2004 | Weimer et al. ............... 4/496 |

* cited by examiner

*Primary Examiner* — William Gilbert
(74) *Attorney, Agent, or Firm* — patenttm.us (57) ABSTRACT

An anchor for a rectangular tube employs a wedge assembly, whereby rotation of an adjustment bolt of the wedge assembly moves an upper and lower wedge member together, and the wedge engagement with a central wedge member causes said central wedge member to move toward engagement with the tube, thereby securing the tube within a base body. Clevis pins and corresponding key hole slots mount the wedge assembly to a base, while allowing easy removal of the wedge when desired.

7 Claims, 8 Drawing Sheets

STARTING PLATFORM WEDGE ANCHOR ASSEMBLY

BACKGROUND OF THE INVENTION

This invention relates to mounting of structures, and more particularly, to a starting platform wedge assembly for securing a starting platform to an anchor member.

In swimming pool technology, a starting platform is mounted at the edge of a pool, from which a swimmer will dive into the pool, particularly in the case of competition swimming. It is typical for such starting platforms to be held in place by a square tube member that fits into a corresponding square receiver at the edge of the pool. The platform is thereby mountable at the pool edge.

Since many commercial pools enjoy multiple uses, the starting wedges are typically removed and installed as needed for the particular use presently being employed.

It becomes difficult to provide a rigid mounting engagement of the starting platform with the base at the pool edge that is also adapted for repeated installation and removal.

SUMMARY OF THE INVENTION

In accordance with the invention, an improved mounting devices is provided for attaching a starting platform or the like, employing an adjustable wedge structure that enables either permanent or removable installation with easy operation, to provide a rigid engagement with an anchor post.

Accordingly, it is an object of the present invention to provide an improved starting platform anchor wedge device.

It is a further object of the present invention to provide an improved method and apparatus for removably mounting a square post member in a receiving base.

It is yet another object of the present invention to provide an improved swimming starting platform anchor post wedge device to secure the starting platform.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises an anchor wedge assembly for securing a square cross section anchor post in a receiving base, applying continuous even pressure to the post to prevent movement thereof.

Figure 1:
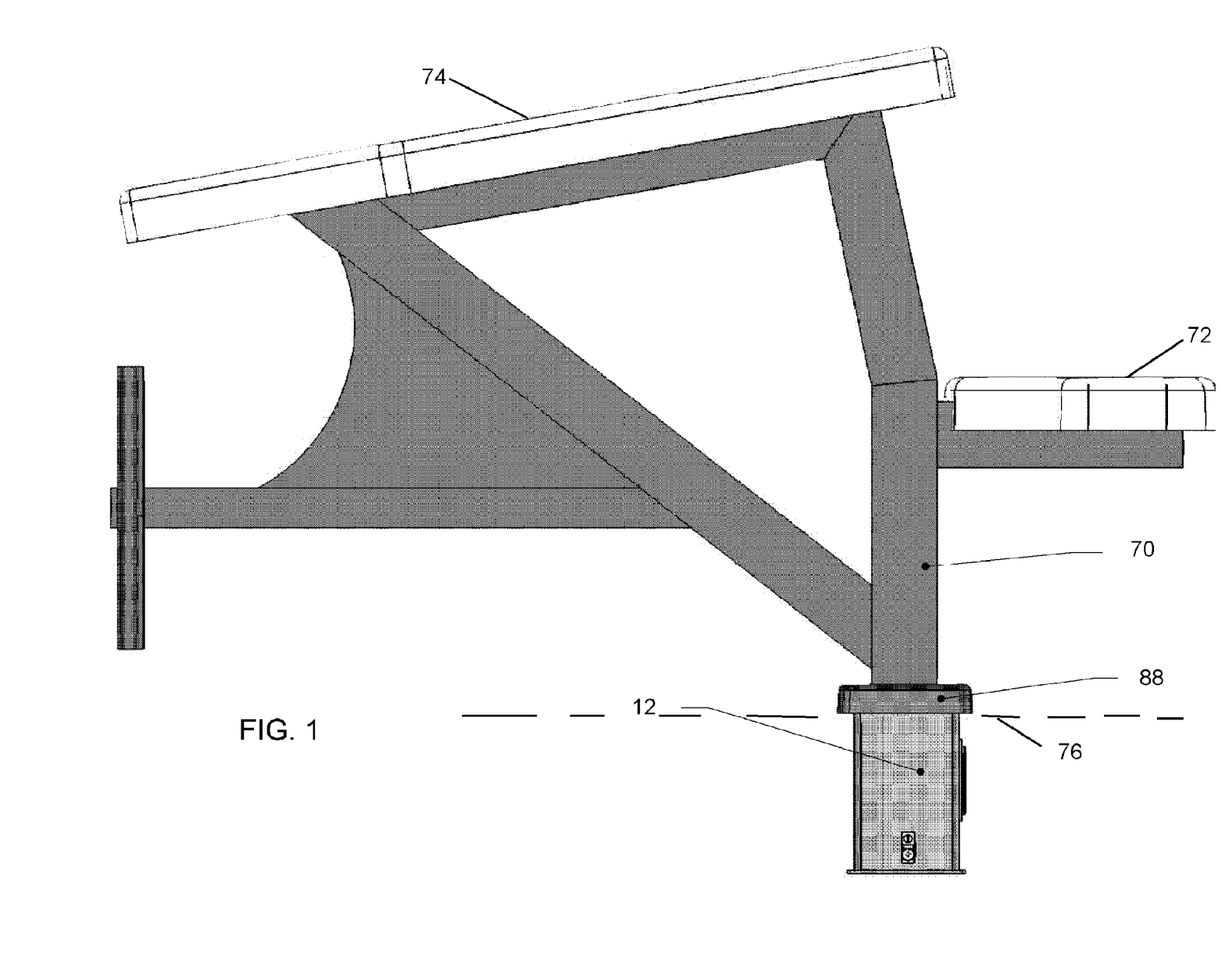
FIG. 1 is a perspective view of a preferred embodiment the starting post anchor wedge inside an anchor body with a starting platform installed therein.

Referring now to FIG. 1, a perspective view of a preferred embodiment the starting post anchor wedge inside an anchor body with a starting platform installed therein, the starting platform 70 is suitable received in the anchor housing 12, to provide a stable mounting. The platform includes a step 72 and a launch region 74, where a diver might typically stand while preparing to jump off the starting platform. The deck level 76 of the pool is illustrated in phantom in FIG. 1. An escutcheon plate 88 is suitably employed to cover the top portion of the device, providing both protection from the elements and tampering, and adding an aesthetic appearance.

Figure 2:
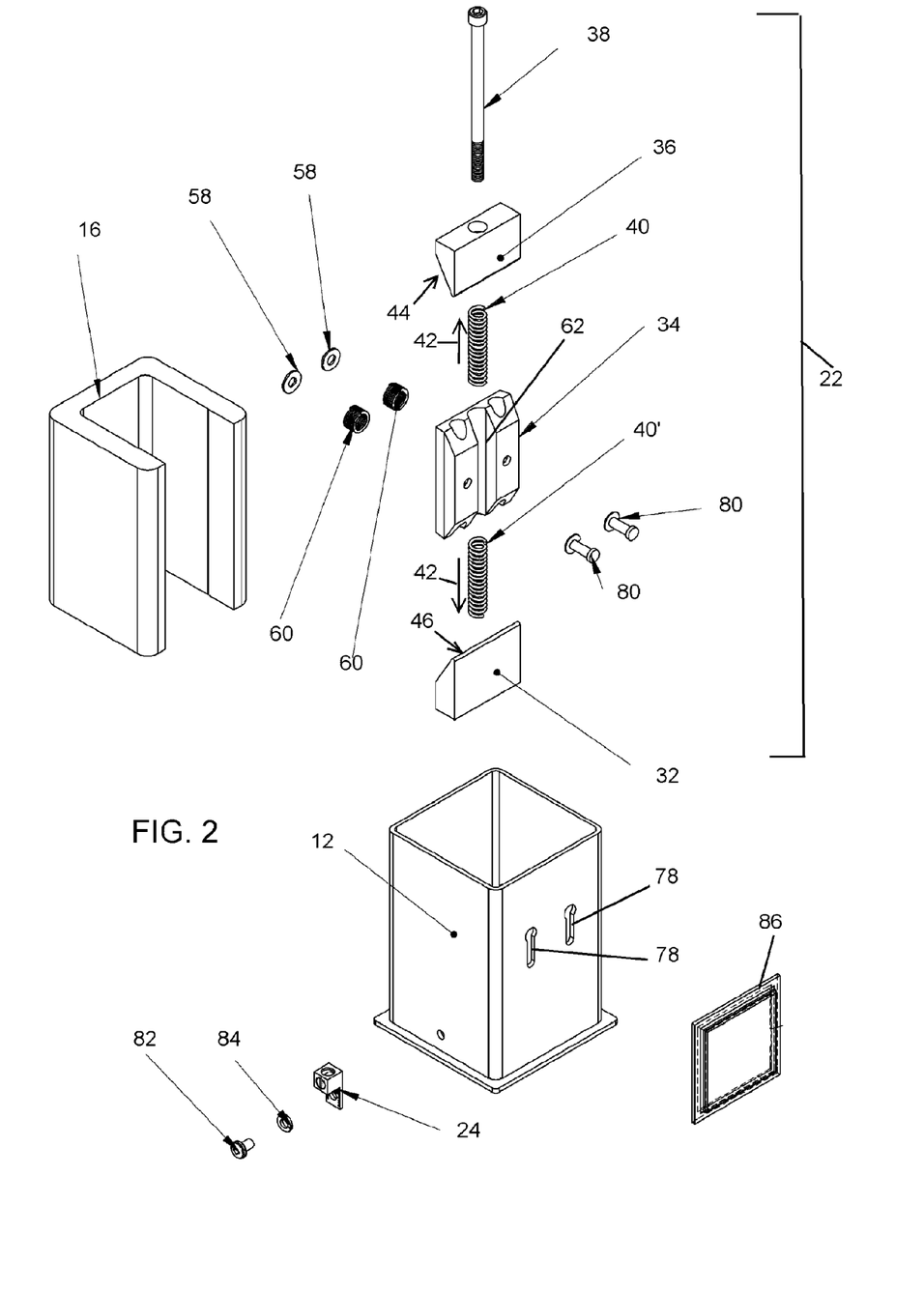
FIG. 2 is an exploded view of the anchor post wedge assembly of FIG. 1 with the post removed.

Referring now to FIG. 2, an exploded view of the preferred embodiment of the anchor 10, the anchor includes a base body 12, suitable formed of stainless steel, which is adapted to be mounted with its top edge flush with the level of the deck surrounding the pool, for example. The base body, receives an anchor liner member 16 therewithin, which is suitably a "U"-shaped or "C"-shaped polymer insert, having an open face along one side thereof, and is of a length slightly less than the depth of the base body, whereby when fully inserted into the base body, a slight recess is defined between the top of the anchor liner and the top edge of the base body. The anchor post (not illustrated) is received within the anchor liner, the dimension of the anchor liner suitably being correspondent to receive the anchor post therewithin.

An anchor wedge assembly 22 mounts along the interior face of the base body in a position corresponding to the open face of the anchor liner, and comprises a lower wedge 32, a middle wedge 34 and an upper wedge 36. An actuating bolt 38 is positioned centrally of the upper wedge 36, and is received in and extends through a central bore defined in the top wedge, extending down along the face of the center wedge (in a slot 62 defined therein) to a threaded receiver defined in a vertical bore in the lower wedge 34 (not visible in FIG. 2). A pair of coil springs 40, 40' receives the actuating bolt therethrough and biases the upper and lower wedges in the directions of arrows 42 by engagement of seat portions 44 and 46 of the upper and lower wedges (not visible in FIG. 2).

A pair of clevis pins 80 are adapted to mount to the central wedge 34 through corresponding through holes therein, and are adapted to fit into corresponding key hole slots 78 defined in a face of the base body 12. The ends of the clevis pins opposite those engagable with the key hole slots carry heads of greater diameter than the holes in wedge 34. A pair of springs 60 and washers 58 cooperate with the greater diameter head portion of the clevis pins so as to provide a biasing force.

A ground lug 24 is provided at the base of the body 12, via threaded bolt 82 and split lock washer 84 (both suitable made of stainless steel) to enable attachment of a grounding strap thereto.

A side cover 86, suitably made of a stainless steel, is provided to cover the keyhole slots 78. A drain hole 90 (visible in FIGS. 4, 5 and 16) may suitable be provided in the bottom of base 12, centrally located for example.

Figure 3:
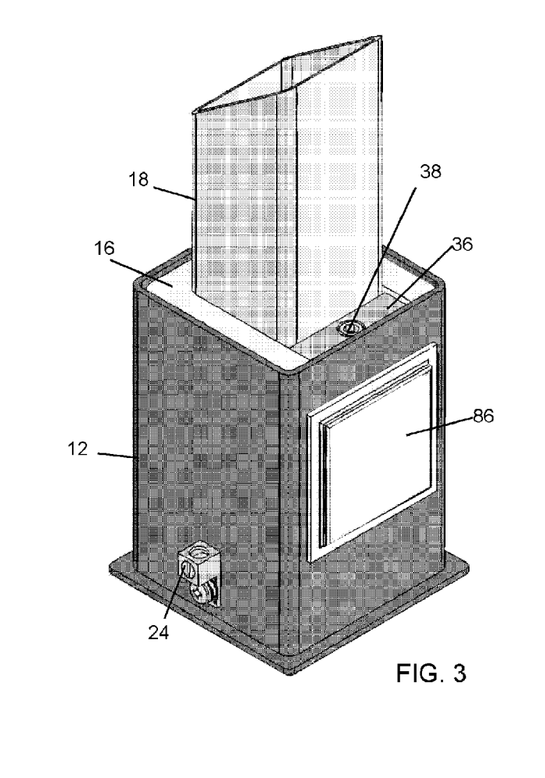
FIG. 3 is a perspective view of the wedge assembly of FIG. 1 with a post installed therein.

Referring now to FIG. 3, a perspective view of the wedge assembly of FIG. 1 with a post 18 installed therein, corresponding elements to the embodiment of FIG. 1 are employed. The placement of the side cover 86 when assembled is further illustrated in FIG. 3.

Figure 4:
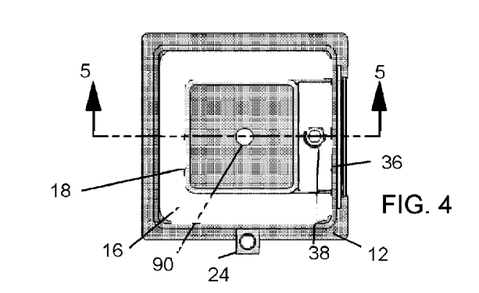
FIG. 4 is a top view of the configuration of FIG. 3.
Figure 5:
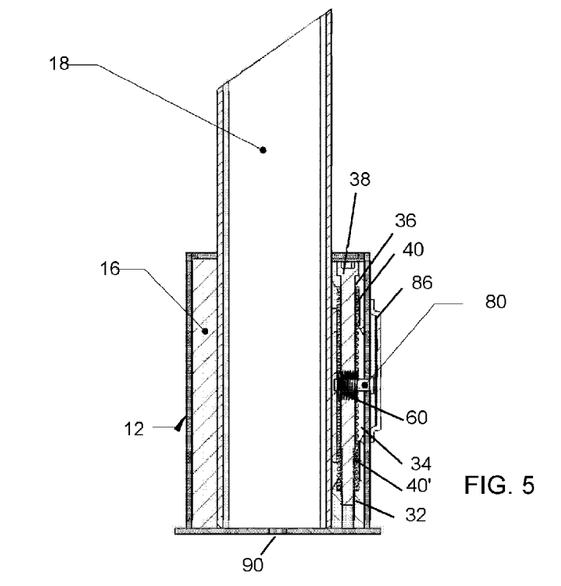
FIG. 5 is a sectional view taken along line 5-5 of FIG. 4.
Figures 6, 7, 10:
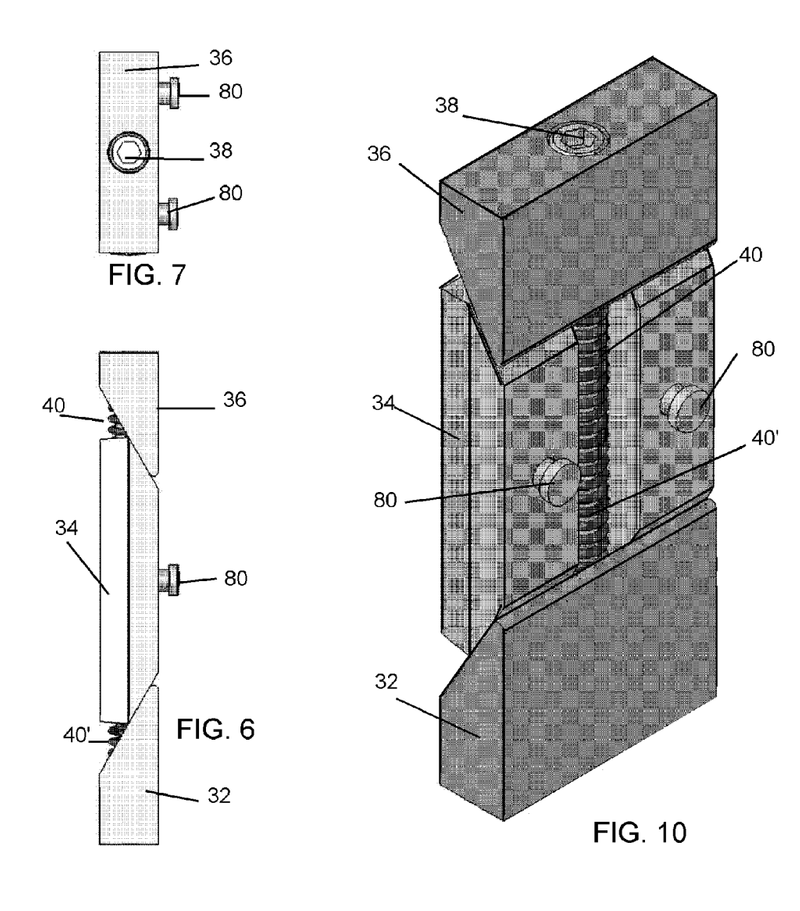
FIG. 6 is a side view of the wedge assembly of FIG. 2 in a collapsed state.
FIG. 7 is a top view of FIG. 6.
FIG. 10 is a perspective view of the wedge assembly of FIG. 2.
Figure 8:
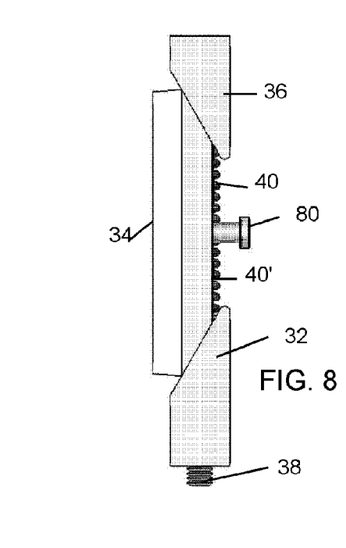
FIG. 8 is a side view of the wedge assembly of FIG. 2 in a fully expanded position.
Figure 9:
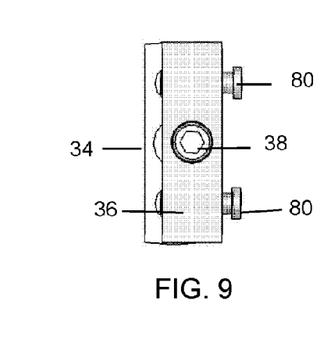
FIG. 9 is a top view of FIG. 8.
Figure 11:
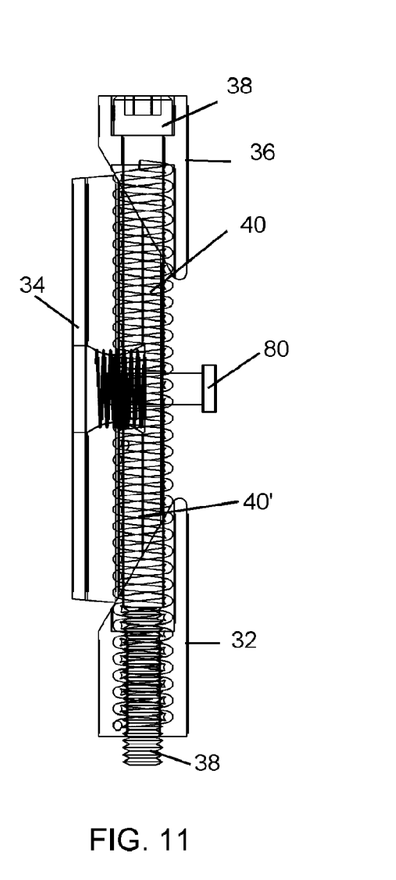
FIG. 11 is a side transparent view of the starting wedge of FIG. 2 in the fully expended position.
Figure 12:
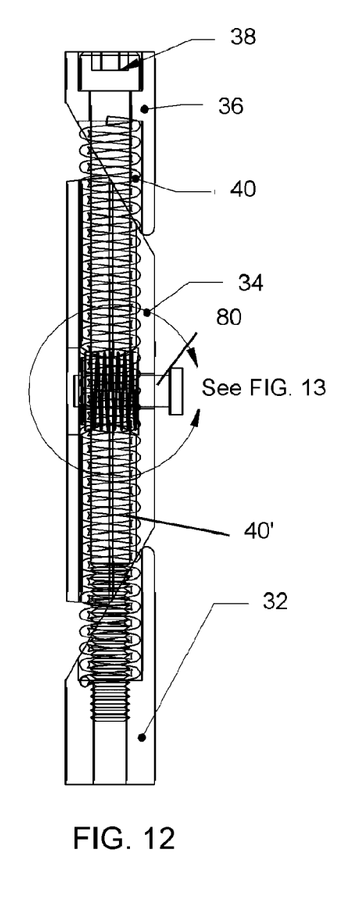
FIG. 12 is a side transparent view of the starting wedge of FIG. 2 in the fully collapsed position.
Figure 13:
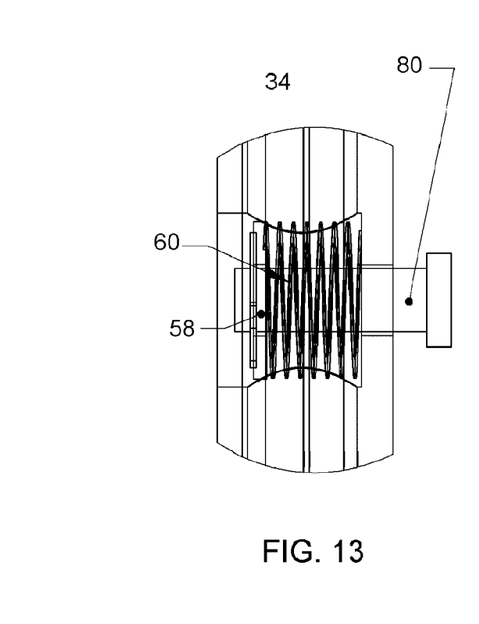
FIG. 13 is a side transparent view of the detail of the clevis pin and springs of the anchor wedge of FIG. 2.

FIG. 4 is a top view of the configuration of FIG. 3, while FIG. 5 is a sectional view taken along line 5-5 of FIG. 4. The placement of one clevis pin 80 is illustrated by showing the pin in the foreground of FIG. 5. Insert 16 is suitably made of a urethane.

Figure 14:
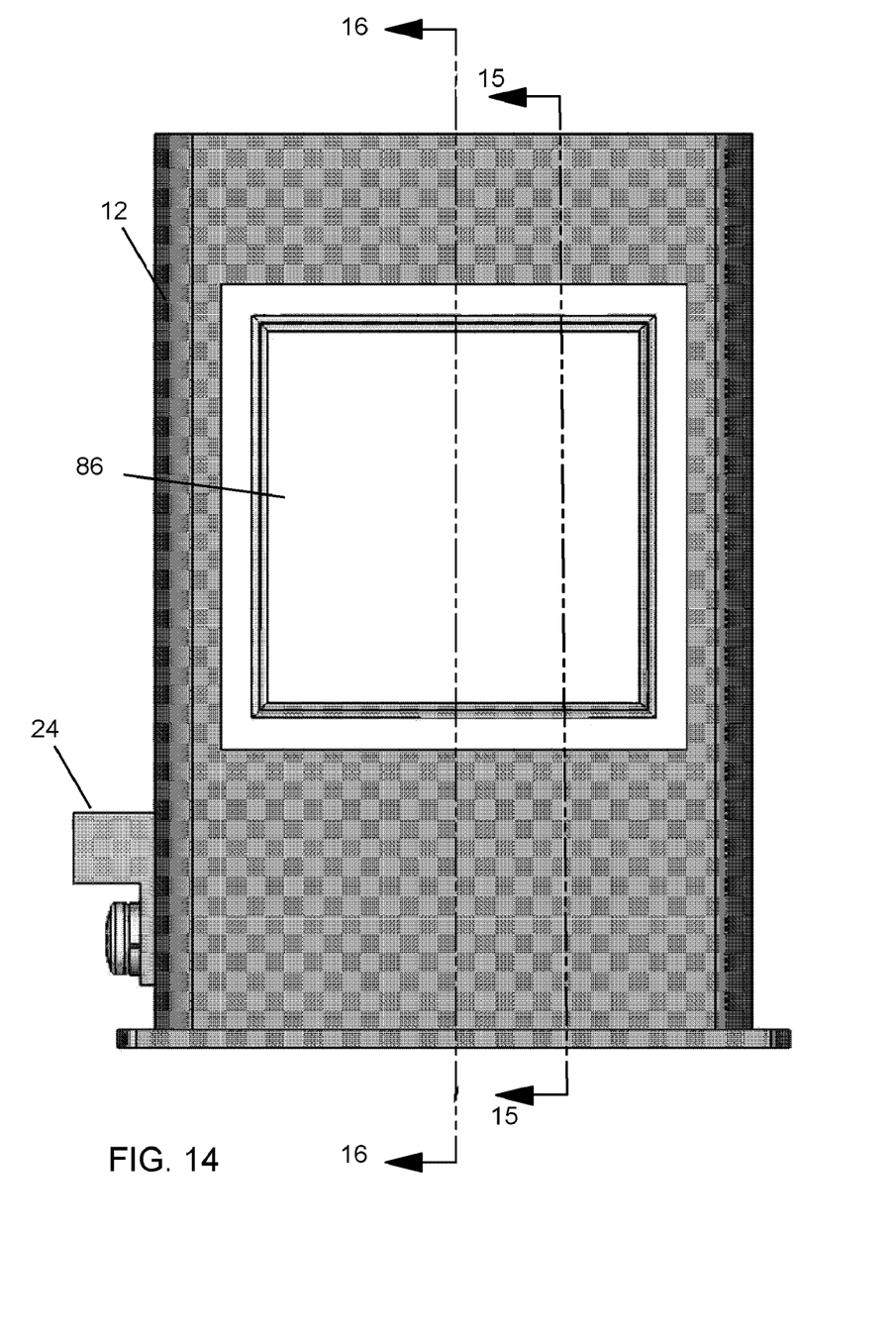
FIG. 14 is a side view of the starting post wedge anchor of FIG. 2 when assembled.
Figure 15:
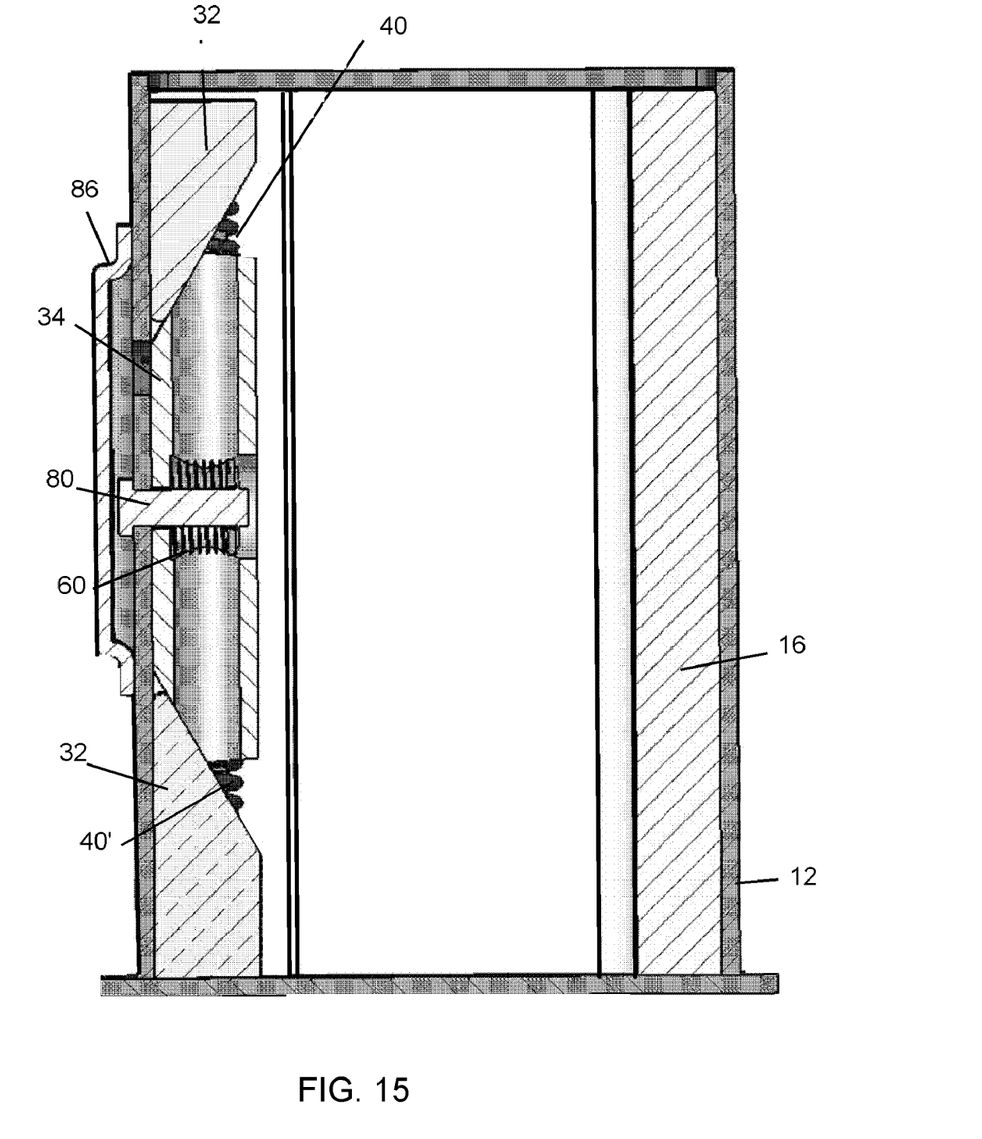
FIG. 15 is a sectional view taken along line 15-15 of FIG. 14.
Figure 16:
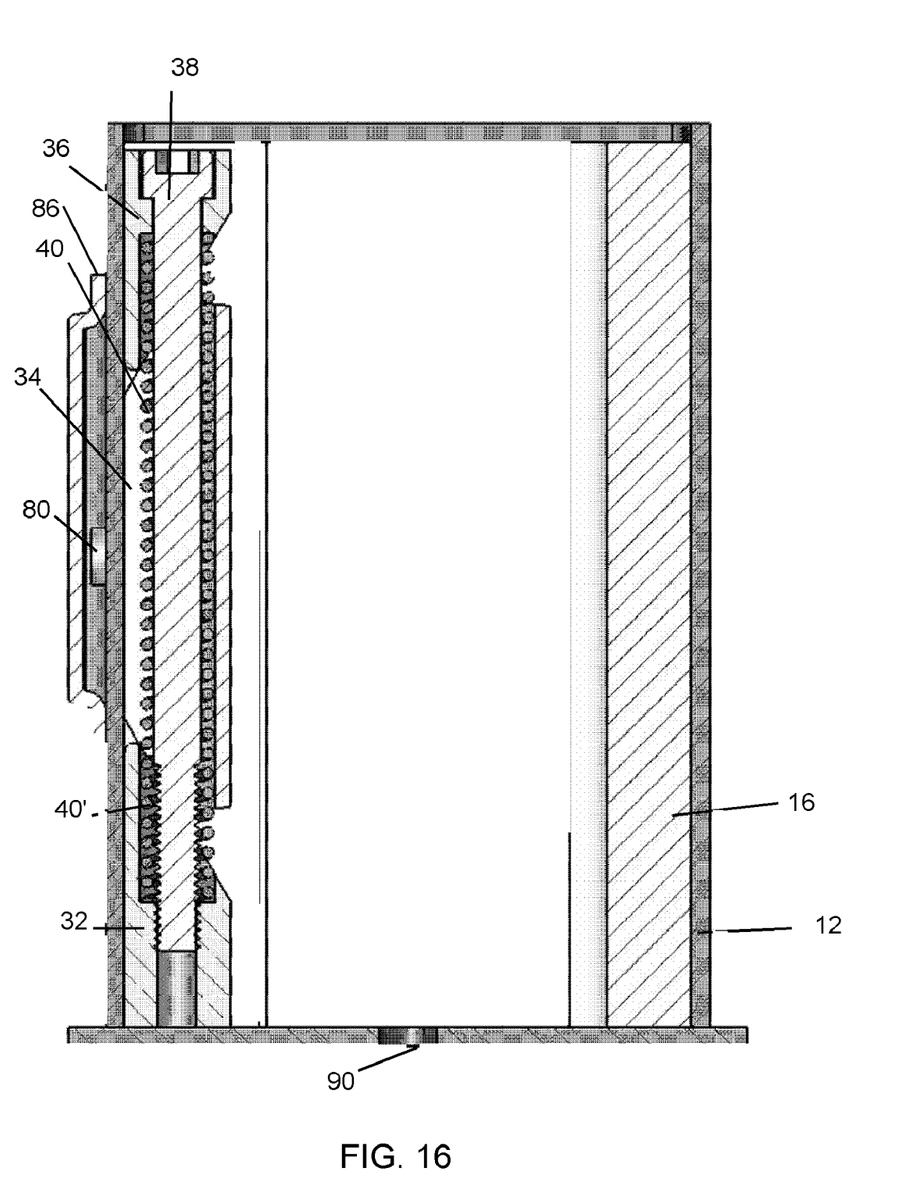
FIG. 16 is a sectional view taken along line 16-16 of FIG. 14.

Further details of the assembled wedge may be observed with reference to FIGS. 7-10 and 11-13, while the assembled wedge installed into the base 12 is shown in further examples in FIGS. 14-16.

The operation of the embodiment of FIGS. 1-14 provides easier removal of the wedge portion by the use of the keyhole slots and clevis pins which fit therein and slid down to the desired position. The bias of springs 60 urge engagement of the clevis pins against the body 12, but allow easier removal of the wedge if necessary. Adjustment of the wedge by rotation of actuating bolt 38 causes the wedge to expand or contract, to tightly engage or retact from the post 18.

Accordingly, the embodiments described herein provide a rigid yet removable engagement of a post, which may be a support post for a starting platform as used in diving and swimming competition, for example. The engagement is sufficient to provide desired quality of engagement of the supporting post.

While plural embodiments of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A swimming starting platform, comprising:
   a launch portion for a swimmer to stand while preparing to jump off the starting platform;
   a support member for supporting the launch portion, including a support post; and
   an anchor housing for receiving the support post, comprising
   a clamp member for engaging a face of the support post, thereby securing the starting platform to the anchor housing by urging said support post into engagement with said anchor housing; and
   said clamp member including an adjustment device for adjustably clamping or unclamping said support post and a biasing element to urge a clamping portion of said clamp member away from engagement with said support post in absence of a clamping force.

2. The swimming starting platform according to claim 1, wherein said adjustment device comprises an adjustment member for extending or retracting a portion of said clamp member into engagement with said support post.

3. The swimming starting platform according to claim 2, wherein said biasing element comprises a spring member that urges a clamping portion of said clamp member away from said starting platform in absence of being tightened down intentionally.

4. The swimming starting platform according to claim 3, wherein said spring member is positioned about said adjustment device.

5. The swimming starting platform according to claim 4, wherein said spring member comprises a coil spring.

6. The swimming starting platform according to claim 2, wherein said adjustment member comprises an adjustment bolt for extending or retracting a portion of said clamp member into engagement with said external surface of said support post.

7. The swimming starting platform according to claim 2, wherein said biasing element allows the clamping member to engage with the support post when there is a clamping force.

* * * * *